United States Patent [19]

Edwards

[11] 4,407,547
[45] Oct. 4, 1983

[54] HYDRAULIC BRAKING SYSTEMS FOR VEHICLES

[75] Inventor: Roy E. Edwards, Warley, England

[73] Assignee: Lucas Industries Limited, Birmingham, England

[21] Appl. No.: 254,602

[22] Filed: Apr. 16, 1981

[30] Foreign Application Priority Data

Apr. 17, 1980 [GB] United Kingdom ............... 8012658

[51] Int. Cl.³ ........................................... B60T 11/12
[52] U.S. Cl. .................................... 303/6 A; 303/52; 180/6.2
[58] Field of Search ......................... 188/349; 180/6.2; 280/211; 303/6 A, 6 C, 52, 56

[56] References Cited

U.S. PATENT DOCUMENTS 3,459,458  8/1969  Green et al. ...................... 303/6 A

*Primary Examiner*—Duane A. Reger

*Attorney, Agent, or Firm*—Scrivener, Clarke, Scrivener and Johnson

[57] ABSTRACT

An hydraulic braking system for vehicles comprises a single pedal-operated master cylinder, a selector valve assembly and a double-acting valve incorporated into a common housing, and an actuator for a brake on either side of the vehicle. A lever acts to close a diverter valve to cut-off the supply of fluid to the actuator on one side when the brake on the other side is to be applied, so that one brake is applied independently of the brake on the other side. Each actuator comprises a differential piston which works in a stepped bore to apply the brake, and when one of the valves closes, the lever simultaneously acts on the double-acting valve to increase the effective area of the actuator for the applied brake. A greater output torque is therefore obtained from the brake on one side when the brake on that side is applied independently than when the brakes on both sides are applied simultaneously.

10 Claims, 3 Drawing Figures

HYDRAULIC BRAKING SYSTEMS FOR VEHICLES

SPECIFIC DESCRIPTION

This invention relates to improvements in hydraulic braking systems for vehicles, such as tractors, of the kind in which brakes on wheels on opposite sides of the vehicle can be applied independently for steering or simultaneously for retarding the progress of the vehicle by means of a single pedal-operated hydraulic master cylinder for supplying hydraulic fluid to the brakes, and a selector valve assembly for controlling the supply of fluid to the brakes on either side, or on both sides, of the vehicle as required.

In known braking systems of the kind set forth it is usual for the supply of fluid to the brake on one side of the vehicle to be cut-off when the brake on the opposite side is to be applied. In such a known system difficulty is experienced in ensuring that adequate braking pressure is available for effective control of braking in either mode. For example, it is necessary to ensure that locking of the wheels is unlikely to occur when the brakes on both sides of the vehicle are applied simultaneously, whereas it may be desirable to be able to lock a wheel on one side of the vehicle to facilitate steering, particularly when it is desired for the vehicle to execute a "spin-turn".

According to our invention an hydraulic braking system of the kind set forth incorporates brake-torque regulating means which operates in conjunction with the selector valve assembly so that, for a given pedal force, an output torque from the brake on either side of the vehicle is greater when the brake on that side is applied independently of the brake on the opposite side than when the brakes on both sides are applied simultaneously.

This has the advantage that locking of a wheel on one side of the vehicle can more readily occur for a given pedal force when the brake on that side only of the vehicle is applied, than when the brakes on both sides are applied simultaneously.

The torque regulating means may conveniently be combined with the selector valve assembly within a common housing.

When the brake on a wheel on one side of the vehicle is applied independently of the brake on a wheel on the opposite side the torque regulating means may act to intensify the pressure applied to the applied brake, or to increase the effective area of an actuator for the applied brake and to which the pressure is applied.

Some embodiments of our invention are illustrated in the accompanying drawings in which.

Figure 1:
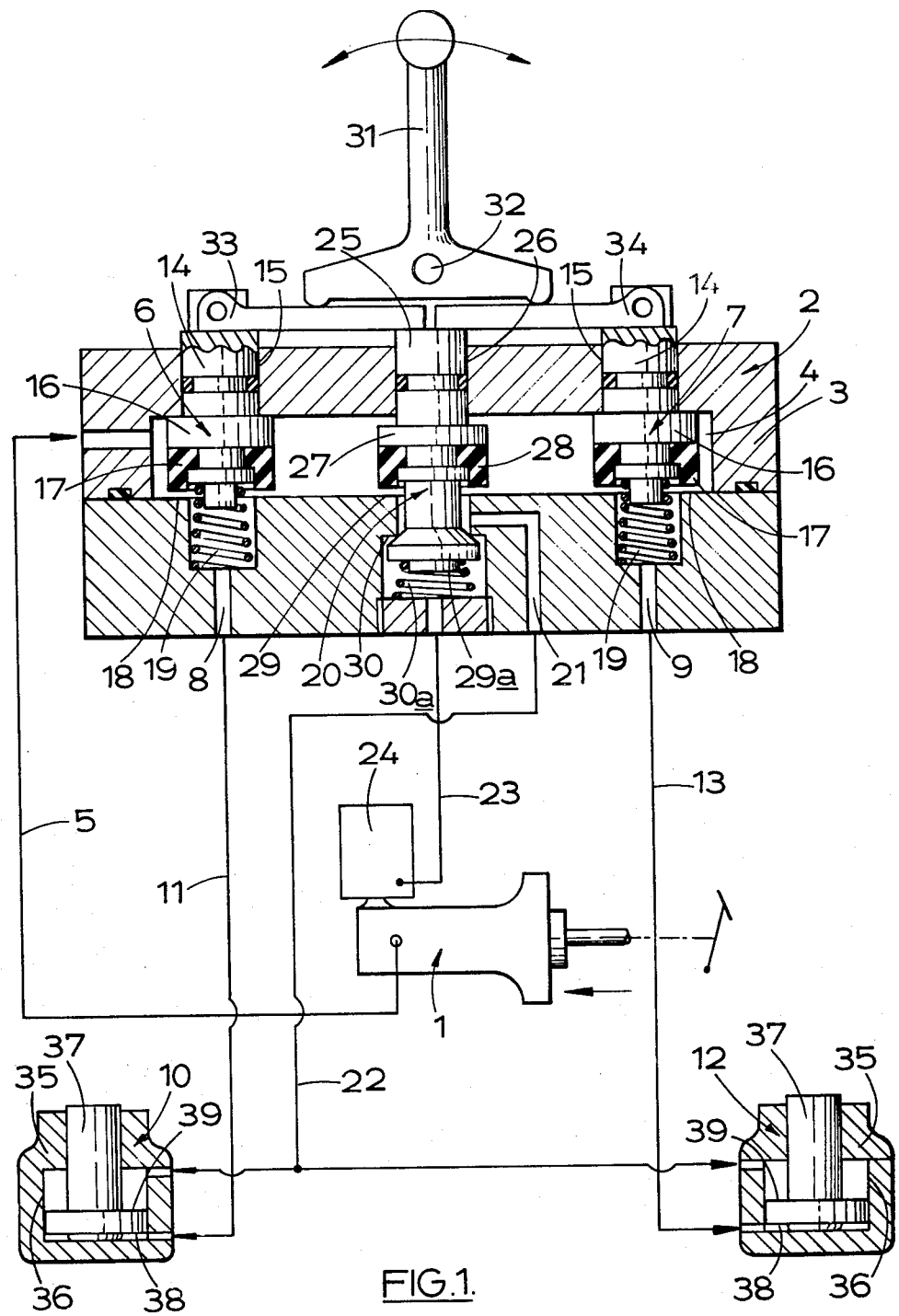
FIG. 1 is a layout of an hydraulic braking system for a vehicle.

FIG. 3 is a layout again similar to FIG. 1 but showing some different modifications In the braking system illustrated in the layout of FIG. 1 a single pedal-operated tandem master cylinder 1 having a single pressure space is adapted to apply brakes on opposite sides of a vehicle through a selector valve 2 which is manually-operable to control the supply of fluid under pressure from the master cylinder 1 to the brakes on both sides of the vehicle simultaneously or to the brakes on either side.

The selector valve 2 comprises a housing 3 incorporating a distribution chamber 4 to which the pressure space is connected through a pipe-line 5. The distribution chamber 4 leads through a pair of normally-open diverter valves 6,7 to outlet ports 8,9. The outlet port 8 is connected to an actuator 10 for a brake on one side of the vehicle through a pipe-line 11, and the outlet port 9 is connected to an actuator 12 for a brake on the opposite side of the vehicle through a pipe-line 13.

Each diverter valve 6,7 comprises a face valve in the form of a valve member of differential outline. The valve member comprises a stem 14 which projects outwardly from the chamber 4 through an opening 15 in a wall of the housing 3 in which it is sealingly guided, an enlarged head 16 carried by the inner end of the stem 14 and carrying a seal 17 which is engageable with a seating 18 surrounding an enlarged recess in communication with the port 8,9, and a spring 19 normally urging the head 16 away from the seating 18.

Brake-torque regulating means comprising a double acting valve 20 spaced between the valves 6 and 7 is also provided in the housing 3 to control communication between the distribution chamber 4 and an outlet port 21 which is connected to both actuators 10,12 through a common pipe-line 22, and between the pipe-line 22 and a return pipe-line 23 to a reservoir 24 for the master cylinder 1.

The double-acting valve 20 comprises a stem 25 which projects outwardly from the chamber 4 through an opening 26 in the same wall of the housing 3 as that through which the stems 14 project, an enlarged first head 27 carried by the inner end of the stem 25 and carrying a seal 28 for engagement with a seating 29 surrounding an opening which leads to the outlet port 21, a second head 29a spaced from the side of the head 27 which is remote from the stem 25 for engagement with a seating 30 between the outlet port 21 and the pipe-line 23, and a spring 30a. The area of the stem 25 is substantially equal to that of the internal diameter of the seating 29 so that the valve 20 is free from loading in response to fluid pressure. Thus the head 29a is normally urged into engagement with the seating 30 and the head 27 is normally urged away from the seating 29 by the spring 30a.

A lever 31 mounted on the housing 3 for pivotal movement about a pivot 32 is engageable at opposite ends at intermediate points in the lengths of two levers 33,34, each pivotally connected at its outer end to a respective one of the valves 6,7 and both acting at their inner ends on the valve 20. In the neutral position shown, both diverter valves 6,7 are open and the head 27 is spaced from the seating 29, but movement of the lever 31 about the pivot 32 in one direction is operative to close a corresponding one of the valves 6,7, and urge the head 27 into engagement with the seating 29. Each actuator 10,12 comprises a housing 35 provided with a stepped bore 36 in which works a differential piston 37 for applying the brake.

The end 38 of the piston 37 which is of greater area is exposed to the pressure in the pipe-line 11,13 whereas the smaller area 39, which is equal to the difference in area between opposite ends of the piston 37, is subjected to any pressure which may be present in the pipe-line 22.

When the lever 31 is in the neutral position illustrated and the master cylinder 1 is operated, fluid is supplied to both actuators 10 and 12 through the open diverter valves 6 and 7, and through the double-acting valve 20.

Since the pressure in the pipe-line 22 acts on the pistons 37 in directions opposite to that in which the pressure in the pipe-lines 11 and 13 acts, the pistons 37 are subjected for a given pressure to a net brake-applying force equal to that pressure multiplied by the area of the smaller end of the piston 37.

When the master cylinder is released fluid from the chamber 4 can return to the reservoir 24 via the pipe-line 5 and the master cylinder 1.

When the lever 31 is moved in a direction to close one of the diverter valves, say the valve 6, movement of the lever in that direction acts through the lever 33 also to urge the seal 28 into engagement with the seating 29 and the head 29a away from the seating 30. This isolates the outlet ports 8 and 21 from the chamber 4, but opens communication between the faces 39 and the reservoir 24. Upon operation of the master cylinder 1 hydraulic fluid can only be supplied to the actuator 12. Since no pressure is acting over the area 39, for the same given pressure referred to above, the piston 37 is subjected to an increased force due to the pressure acting over the area 38.

It follows therefore that for a given master cylinder pressure the braking torque applied to a brake on a wheel on one side of the vehicle when that brake is applied on its own is greater that when the brakes on the wheels on opposite sides of the vehicle are applied simultaneously. This makes it easier for the driver to lock a wheel on one side of the vehicle to as required when executing a "spin-turn".

Figure 2:
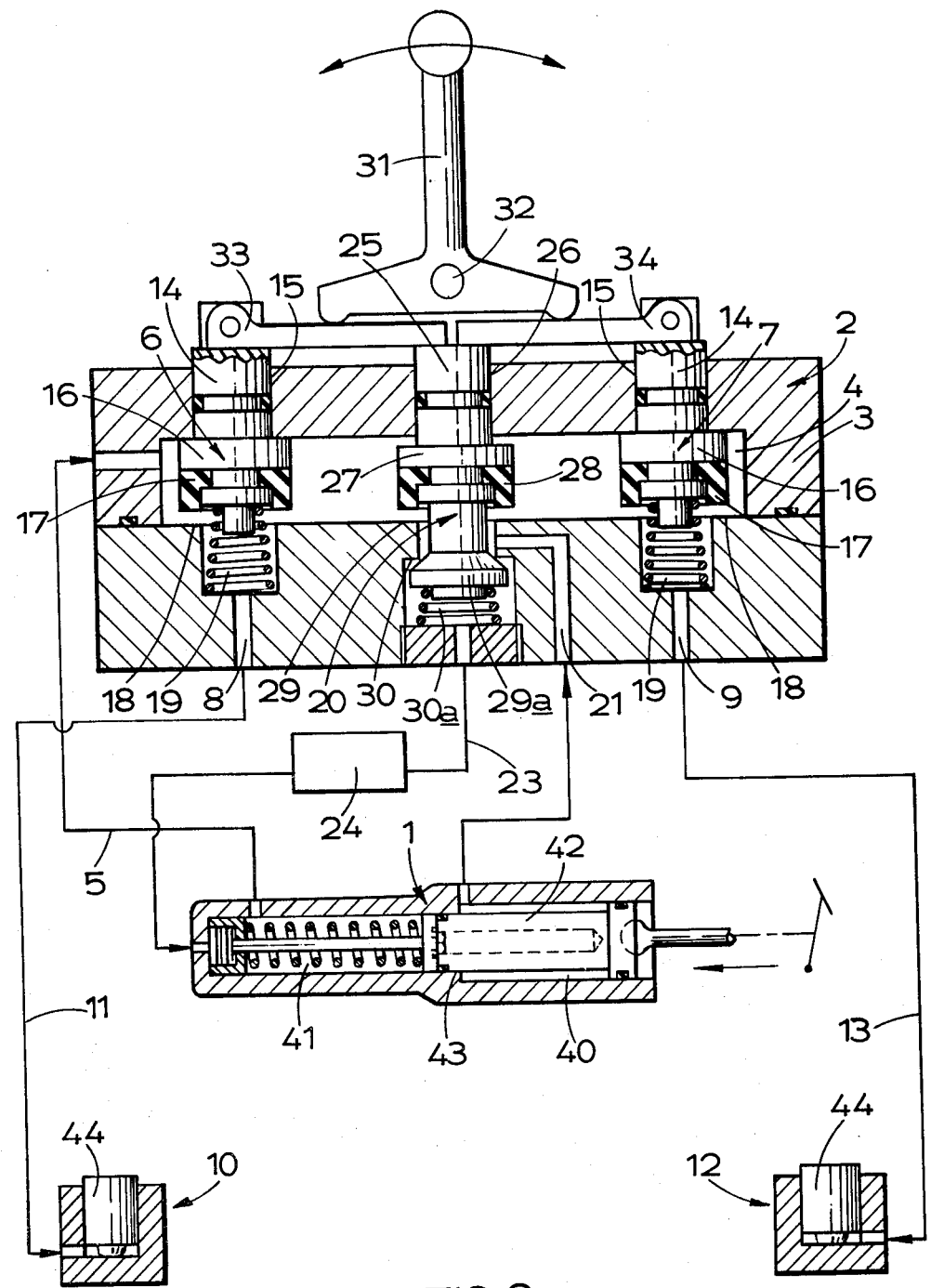
FIG. 2 is a layout similar to FIG. 1 but showing a modification.

In the braking system of FIG. 2 the master cylinder 1 is of tandem construction having a primary pressure space 40 which is connected to the port 21, which serves as an inlet port, and a secondary pressure space 41 which is connected to the pipe-line 5. The master cylinder 1 has a differential piston 42 working in a stepped bore 43 with the primary pressure space defined between the corresponding portions of the piston 42 and the bore 43, which are of different areas, and the secondary pressure space 41 is defined between the end of the piston which is of smaller area and the closed inner end of the bore 43.

Each actuator 10,12 comprises a piston 44 working in a plain bore and exposed at one end to a respective pipe-line 11,13.

When the selector valve is in the neutral position shown with the head 29a in engagement with the seating 30 and the master cylinder 1 is operated, fluid from both pressure spaces 40 and 41 is supplied to the chamber 4 from whence it is supplied simultaneously to both actuators 10 and 12 through the open valves 6 and 7.

The brake torque for each brake is therefore related to the pedal effort by a function determined by the sum of the areas of the two pressure spaces 40 and 41.

When the lever 31 is moved in a direction to close one of the diverter valves, say the valve 6, and urge the head 29a away from the seating 30 with the seal 28 engaging with the seating 29 as described above, the pressure space 40 is then placed in communication with the reservoir 24. This means that when the master cylinder 1 is operated only fluid from the secondary pressure space 41 is supplied to the actuator 12 to apply the brake on that side of the vehicle. Since the pressure in the master cylinder 1 is generated only in the secondary pressure space, a given pedal effort is operative to generate a higher pressure than that which was generated when both pressure spaces 41 and 40 were operative.

The construction and operation of the system of FIG. 2 is otherwise the same as that of FIG. 1 and corresponding reference numerals have been applied to corresponding parts.

Figure 3:
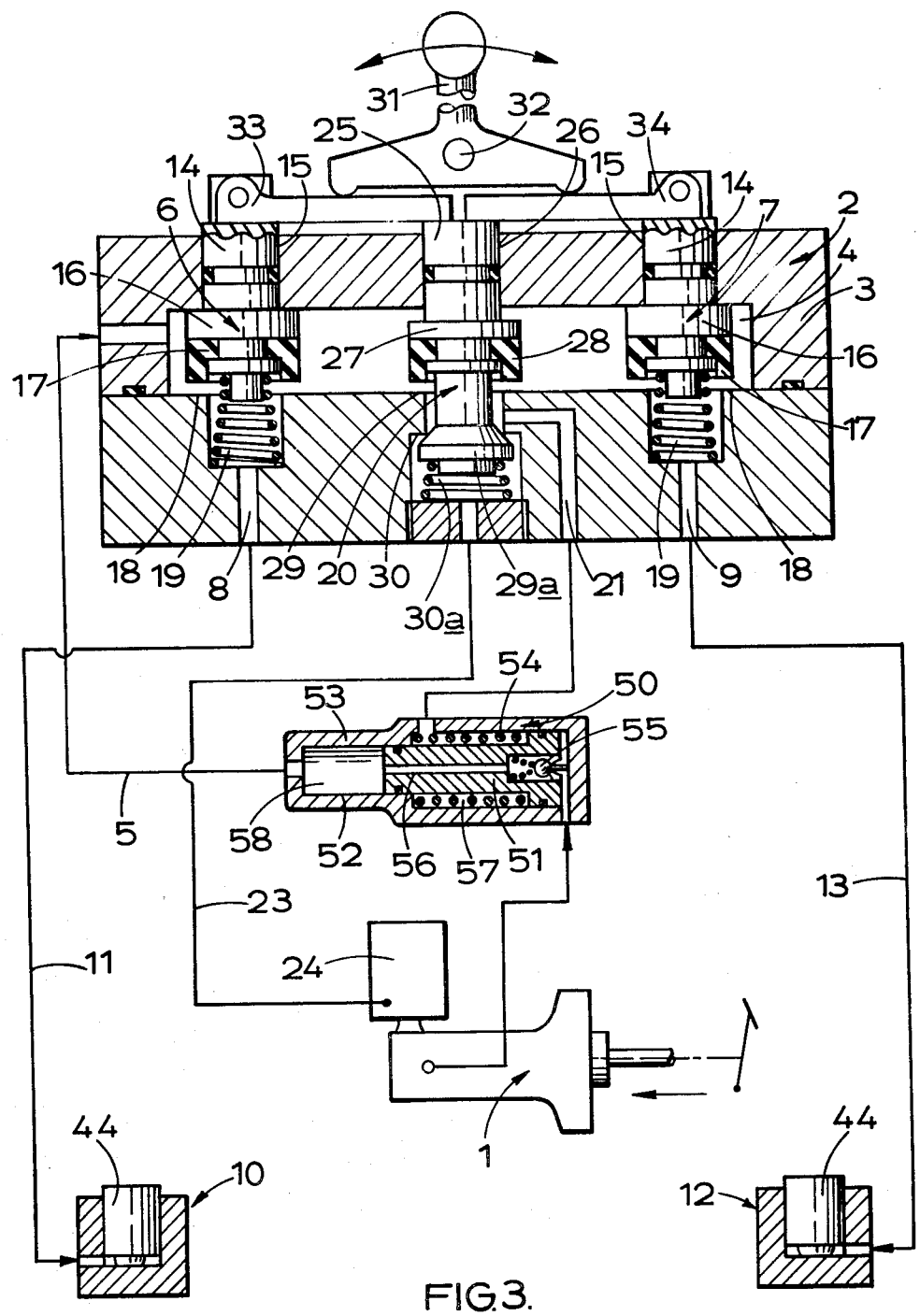

In the system of FIG. 3, a pressure intensifying valve 50 is interposed between the signal pressure space of the master cylinder 1 and the pipe-line 5, and the port 21, which again serves as an inlet port.

The intensifying valve 50 comprises a differential piston 51 which works in a stepped bore 52 in a housing 53, and a spring 54 acts normally to urge the end of the piston 51 which is at greater area towards the adjacent end of the bore in which position a oneway valve 55 is open to allow communication between opposite ends of the piston 51 to take place through an axial bore 56. An annular chamber 57 is defined between the corresponding portions of the piston 51 and the bore 52 which are of different areas, and a pressure space 58 is defined between the end of the piston 51 which is of smaller area and the adjacent end of the bore 52.

The end of the piston 51 which is of greater area is connected to the pressure space in the master cylinder 1, and the end of smaller area is connected to the pipe-line 5.

Each actuator 10,12 is identical in construction to the actuator 10,12 of the system of FIG. 2.

When the lever 31 is in the neutral position shown and the master cylinder 1 is operated the fluid under pressure from the master cylinder 1 is supplied directly to the chamber 4 through the one-way valve 55, which is open, and the bore 56. Since the pressure in the chamber 4 is also effective in the annular chamber 57 of the intensifier 50 the net force acting on the piston 51 is that of the spring 54. The one-way valve 55 is thereby maintained in the open position shown and normal master cylinder pressure is supplied to both actuators 10 and 12.

When the lever 31 is moved in a direction to close one of the diverter valves, say the valve 6, and urge the head 29a away from the seating 30 with the seal engaging the seating 29 as described above, the space 57 is connected to the reservoir 24. When the master cylinder 1 is operated fluid from the master cylinder 1 is supplied to the actuator 12 through the pipe-line 5 from the intensifier 50 via the pressure space 58. The pressure from the master cylinder 1 acts on the piston 51 to advance it in the bore 52. This displaces the fluid from the annular chamber 57 via the passageway 21 and the pipe-line 23 to the reservoir 24. The master cylinder pressure acts over the effective differential area of the piston 51. Therefore, for a given pedal effort, a higher pressure is generated than that which can be generated when the space 57 is operative.

The construction and operation of the system of FIG. 3 is otherwise the same as that of FIG. 2 and corresponding reference numerals have been applied to corresponding parts.

In the systems of FIGS. 1 and 2 described above the pedal efforts and the pedal travel can be optimised by a suitable choice of the effective areas of the pistons of the master cylinder 1 and the valves 6,7 and 20. The same can be achieved in respect of the system of FIG. 3 by suitable choice of the differential area of the piston 51.

The selector valve 2 may be operated by hand. However, in other constructions, the selector valve may be operated by a foot, suitably in conjunction with the single pedal, or by electrical means, for example by a three-position switch.

The particular construction of selector valve described above has the advantage that the members of the valves 6 and 7 are held in their selected positions by the pressures in the respective chamber 4, by virtue of the different areas of seals on the stems 14 and the seals 17. Thus any danger of the system changing into a different mode during a brake application is substantially eliminated.

I claim:

1. An hydraulic braking system for a vehicle comprising brakes on opposite sides of the vehicle, actuator means for operating said brakes, a single pedal-operated hydraulic master cylinder for supplying hydraulic fluid to said actuator means to apply said brakes, a selector valve assembly for controlling independently or simultaneously the supply of hydraulic fluid to said actuator means for said brakes on one or both sides of the vehicle, whereby said brakes can be applied independently for steering or simultaneously for retarding the progress of the vehicle, and brake torque regulating means operable in conjunction with said selector valve assembly, said selector valve assembly comprising a housing having an inlet port and a pair of outlet ports, a distribution chamber in said housing, a pair of normally open diverter valves, and valve control means, said inlet port being connected to said master cylinder, each outlet port being connected to a respective one of said actuator means, each diverter valve controlling communication between said distribution chamber and a respective one of said outlet ports, and said valve control means being operable to simultaneously close either one of said diverter valves and operate said torque regulating means, whereby, for a given pedal force, an output torque from each said brake is greater when the said brake is applied independently of said brake on the opposite side of said vehicle than when both said brakes are applied simultaneously.

2. An hydraulic braking system for a vehicle comprising brakes on opposite sides of the vehicle, actuator means for operating said brakes, a single pedal-operated hydraulic master cylinder for supplying hydraulic fluid to said actuator means to apply said brakes, a selector valve assembly for controlling independently or simultaneously the supply of hydraulic fluid to said actuator means for said brakes on one or both sides of the vehicle, whereby said brakes can be applied independently for steering or simultaneously for retarding the progress of the vehicle, and brake torque regulating means operable in conjunction with said selector valve assembly, said actuator means for each brake comprising an actuator housing, a stepped bore in said actuator housing and a differential piston for applying said brake whereby the effective area of one of said actuator means is increased when the said brake which it operates is applied independently of said brake on the opposite side of the vehicle, so that, for a given pedal force, an output torque from each said brake is greater when the said brake is applied independently of said brake on the opposite side of said vehicle than when both said brakes are applied simultaneously.

3. A braking system as claimed in claim 1, wherein said housing has a fluid port, and a further outlet port for connection to a reservoir for said master cylinder, and said torque regulating means comprises a double acting valve incorporated in said housing which controls communication between said distribution chamber and said fluid port, and between said fluid port and said further outlet port.

4. A braking system as claimed in claim 3, wherein said double acting valve comprises a first valve seating in said housing disposed between said distribution chamber and said fluid port, a second valve seating in said housing disposed between said fluid port and said further outlet port, a valve member having first and second valve heads for respective engagement with said first and second valve seatings, and a spring for urging said valve member into a first position in which said second valve head engages with said second valve seating and said first valve head is spaced from said first valve seating.

5. A braking system as claimed in claim 4, wherein said valve control means comprises a lever pivotally mounted for rocking movement about a pivot in said housing, movement about said pivot in one direction being operative to close a corresponding one of said diverter valves and at the same time to urge said valve member of said double acting valve into a second position in which said first valve head engages with said first valve seating and said second valve head is spaced from said second valve seating.

6. A braking system as claimed in claim 3, wherein said fluid port comprises an outlet port which is connected to said actuator means on both sides of the vehicle through a common connection, said actuator means for each brake comprising an actuator housing, a stepped bore in said actuator housing and a differential piston for applying said brake.

7. A braking system as claimed in claim 3, wherein said fluid port comprises an inlet port which is connected to a pressure intensifier.

8. A braking system as claimed in claim 7, wherein said pressure intensifier comprises a housing, primary and secondary pressure spaces in said housing, a stepped bore in said housing, and a differential piston working in said bore, said primary pressure space being defined between corresponding portions of said piston and said bore which are of different areas and being connected to said fluid port, and said secondary pressure space being defined between the end of said piston which is of smaller area and the adjacent end of said bore and being connected to said distribution chamber of said selector valve assembly.

9. A braking system as claimed in claim 7 or claim 8, wherein said pedal-operated hydraulic master cylinder constitutes said pressure intensifier.

10. A braking system as claimed in claim 7, wherein said pressure intensifier comprises a separate pressure intensifying valve comprising a housing, a stepped bore in said housing, a differential piston working in said bore, an annular chamber defined between corresponding portions of said piston and said bore which are of different areas, a pressure space defined between the end of said piston which is of smaller area and the adjacent end of said bore, an inlet chamber defined between the end of said piston which is of larger area and the adjacent end of said bore, and a one-way valve, said annular chamber being connected to said fluid port, said pressure space being connected to said distribution chamber of said selector valve assembly, said inlet chamber being connected to said master cylinder, and said one-way valve allowing communication between said inlet chamber and said pressure space.

* * * * *